(12) United States Patent
Appuraj et al.

(10) Patent No.: US 12,184,066 B2
(45) Date of Patent: Dec. 31, 2024

(54) SYSTEMS AND METHODS FOR OPERATING A POWER GENERATING ASSET

(71) Applicant: General Electric Renovables Espana, S.L., Barcelona (ES)

(72) Inventors: Karthikeyan Appuraj, Hyderabad (IN); Aditya Vyas, Bengaluru (IN)

(73) Assignee: General Electric Renovables Espana, S.L., Barcelona (ES)

( * ) Notice: Subject to any disclaimer, the term of this patent is extended or adjusted under 35 U.S.C. 154(b) by 534 days.

(21) Appl. No.: 17/342,635

(22) Filed: Jun. 9, 2021

(65) Prior Publication Data
US 2022/0399752 A1 Dec. 15, 2022

(51) Int. Cl.
*H02J 13/00* (2006.01)
*F03D 7/02* (2006.01)
(Continued)

(52) U.S. Cl.
CPC ...... *H02J 13/00002* (2020.01); *F03D 7/0284* (2013.01); *F03D 7/045* (2013.01);
(Continued)

(58) Field of Classification Search
CPC .. H02J 13/00002; H02J 3/004; H02J 2203/20; H02J 2300/28; F03D 7/0284;
(Continued)

(56) References Cited

U.S. PATENT DOCUMENTS 9,077,204 B2 7/2015 More et al.
9,098,876 B2 8/2015 Steven et al.
(Continued)

FOREIGN PATENT DOCUMENTS

CN 101931241 B 4/2013
CN 102694391 B 9/2014
(Continued)

OTHER PUBLICATIONS

The Search Report for EP application No. 22172771.2, Oct. 17, 2022, 7 pages.

*Primary Examiner* — Santosh R Poudel
(74) *Attorney, Agent, or Firm* — Dority & Manning, P.A.

(57) ABSTRACT

A system and method are provided for operating a power generating asset coupled to an electrical grid. Accordingly, a controller receives an environmental data set indicative of at least one environmental variable projected to affect the power generating asset over a plurality of potential modeling intervals. The controller then determines the variability of the environmental data set and a corresponding modeling-confidence level at each of the potential modeling intervals based on the variability. A modeling interval is thus selected corresponding to a desired modeling-confidence level. A computer-implemented model is employed to predict a future power profile for the power generating asset over the selected modeling interval. The future power profile is indicative of a power-delivery capacity of the power generating asset at each of a plurality of time intervals of the modeling interval. Based, at least in part, on the future power profile, the controller determines an obligated-power-production schedule for the power generating asset over the modeling interval. The obligated-power-production schedule corresponds to a power production agreement with the electrical grid. In accordance with the obligated-power-production schedule, the controller modifies at least one setpoint of the power generating asset to deliver electrical power to the electrical grid.

20 Claims, 5 Drawing Sheets

(51) Int. Cl.
    *F03D 7/04*     (2006.01)
    *F03D 9/25*     (2016.01)
    *G05B 13/04*     (2006.01)
    *H02J 3/00*     (2006.01)

(52) U.S. Cl.
    CPC ........... *F03D 9/255* (2017.02); *G05B 13/048* (2013.01); *H02J 3/004* (2020.01); *F05B 2220/706* (2013.01); *F05B 2270/1033* (2013.01); *H02J 2203/20* (2020.01)

(58) Field of Classification Search
    CPC . F03D 7/045; F03D 9/255; F03D 1/02; F03D 7/028; F03D 17/00; F03D 80/00; G05B 13/048; F05B 2220/706; F05B 2270/1033; Y02E 10/72
    See application file for complete search history.

(56) References Cited

U.S. PATENT DOCUMENTS

| | | | |
|---|---|---|---|
| 9,312,698 | B2 | 4/2016 | Subbotin et al. |
| 10,079,317 | B2 | 9/2018 | Gonatas |
| 11,174,840 | B2 * | 11/2021 | Jessen ..................... F03D 7/048 |
| 2007/0061021 | A1 * | 3/2007 | Cohen ................... G05B 13/026 |
| | | | 700/275 |
| 2008/0249665 | A1 * | 10/2008 | Emery ..................... H02J 3/472 |
| | | | 700/291 |
| 2012/0219146 | A1 * | 8/2012 | Mason ................... H04M 9/082 |
| | | | 379/406.01 |
| 2014/0213926 | A1 * | 7/2014 | Vaidyanathan .... A61N 1/36135 |
| | | | 600/545 |
| 2014/0312620 | A1 * | 10/2014 | Korber .................. F03D 7/0284 |
| | | | 290/44 |
| 2014/0371934 | A1 * | 12/2014 | Kubota .................. G05B 13/04 |
| | | | 700/291 |
| 2015/0241892 | A1 * | 8/2015 | Gaucher ................... G05F 1/67 |
| | | | 700/291 |
| 2017/0211468 | A1 * | 7/2017 | Devarakonda ........... F01N 9/00 |
| 2019/0058330 | A1 * | 2/2019 | Kobayashi ............. G06Q 50/06 |
| 2020/0150706 | A1 * | 5/2020 | Moosvi ................... G06F 1/263 |
| 2020/0303925 | A1 * | 9/2020 | Reddy ....................... G05F 1/66 |

FOREIGN PATENT DOCUMENTS

| | | |
|---|---|---|
| CN | 102751728 B | 11/2014 |
| CN | 103107558 B | 4/2015 |
| CN | 103326387 B | 4/2015 |
| CN | 104536826 B | 10/2015 |
| CN | 104969437 A | 10/2015 |
| CN | 103606967 B | 11/2015 |
| CN | 106251074 A | 12/2016 |
| CN | 104779631 B | 7/2017 |
| CN | 106384168 A | 8/2017 |
| CN | 104979850 B | 9/2017 |
| CN | 109274126 A | 1/2019 |
| CN | 109286186 A | 1/2019 |
| CN | 106712114 B | 3/2019 |
| CN | 109785186 A | 5/2019 |
| WO | WO2021/058070 A1 | 4/2021 |

\* cited by examiner

SYSTEMS AND METHODS FOR OPERATING A POWER GENERATING ASSET

FIELD

The present disclosure relates in general to power generating assets, and more particularly to systems and methods for operating power generating assets based, at least in part, on a predicted power-delivery capacity of the power generating asset.

BACKGROUND

As disclosed herein, power generating assets may take a variety of forms and may include power generating assets which rely on renewable and/or nonrenewable sources of energy. Those power generating assets which rely on renewable sources of energy may generally be considered one of the cleanest, most environmentally friendly energy sources presently available. For example, solar power generators and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple wind turbine generators that are operable to supply power to a transmission system providing power to a power grid.

When the power generating asset is connected to an electrical grid, often the power generating asset may agree to deliver a certain quantity of power to the electrical grid. However, given the varying nature of the renewable energy sources, the power generating asset may encounter certain difficulties in meeting the obligations to the electrical grid. For example, the predicted environmental conditions upon which the agreement was based may not come to fruition, and the power generating asset may, therefore, be unable to deliver the obligated quantity of power to the electrical grid.

The agreements between the power generating asset and the electrical grid may include financial incentives and/or penalties corresponding to the delivery of the agreed to quantity of power. Additionally, the electrical grid may utilize an energy market which may facilitate the monetization of the power developed by the power generating asset when the productivity of the power generating asset sufficiently predictable. Accordingly, it may be desirable to implement systems and methods which facilitate the satisfaction of the power delivery obligations of the power generating asset to the electrical grid, while facilitating the participation of the power generating asset in energy markets and maintaining asset health.

In view of the aforementioned, the art is continuously seeking new and improved systems and methods for operating the power generating asset based, at least in part, on the predicted power-delivery capacity of the power generating asset.

BRIEF DESCRIPTION

Aspects and advantages of the invention will be set forth in part in the following description, or may be obvious from the description, or may be learned through practice of the invention.

In one aspect, the present disclosure is directed to a method for operating a power generating asset, which may have at least one generator, coupled to an electrical grid. The method may include receiving, via a controller, an environmental data set indicative of at least one environmental variable projected to affect the power generating asset over a plurality of potential modeling intervals. The method may also include determining, via the controller, a degree of variability of the environmental data set at each of the plurality of potential modeling intervals. The controller may also determine a modeling-confidence level at each of the plurality of potential modeling intervals based, at least in part, on the corresponding degree of variability. A modeling interval of the plurality of potential modeling intervals corresponding to a desired modeling-confidence level may be selected via the controller. Additionally, the method may include predicting, via a computer-implemented model programmed in the controller, a future power profile for the power generating asset over the selected modeling interval, the future power profile being indicative of a power-delivery capacity of the power generating asset at each of a plurality of time intervals of the modeling interval. Based, at least in part, on the future power profile, the controller may determine an obligated-power-production schedule for the power generating asset over the modeling interval. The obligated-power-production schedule may correspond to a power production agreement with the electrical grid. Further, the method may include modifying, via the controller, at least one setpoint of the power generating asset to deliver power to the electrical grid in accordance with the obligated-power-production schedule.

In an additional aspect, the present disclosure is directed to a system for operating a power generating asset having at least one generator. The system may include a controller communicatively coupled to the generator. The controller may include at least one processor configured to perform a plurality of operations. The plurality of operations may include any of the operations and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for operating a power generating asset connected to an electrical grid. In particular, the present disclosure may include systems and methods which may facilitate the accurate prediction of a future power profile for the power generating asset over a selected modeling interval. The selected modeling interval may correspond to a time period over which a degree of variability of an environmental data set (e.g. a weather forecast) is sufficiently low that confidence in the output of a predictive model is sufficiently high. The selected model may also account for measures of asset health. Because of the confidence in the output of the model, the future power profile may be employed to participate in energy markets and/or to satisfy power production commitments. Accordingly, the future power profile may facilitate the development of an obligated-power-production schedule for the power generating asset which corresponds to a power production agreement with the electrical grid. As such, the control of the power generating asset may be based on, or modified to conform with, the obligated-power-production schedule.

Figure 1:
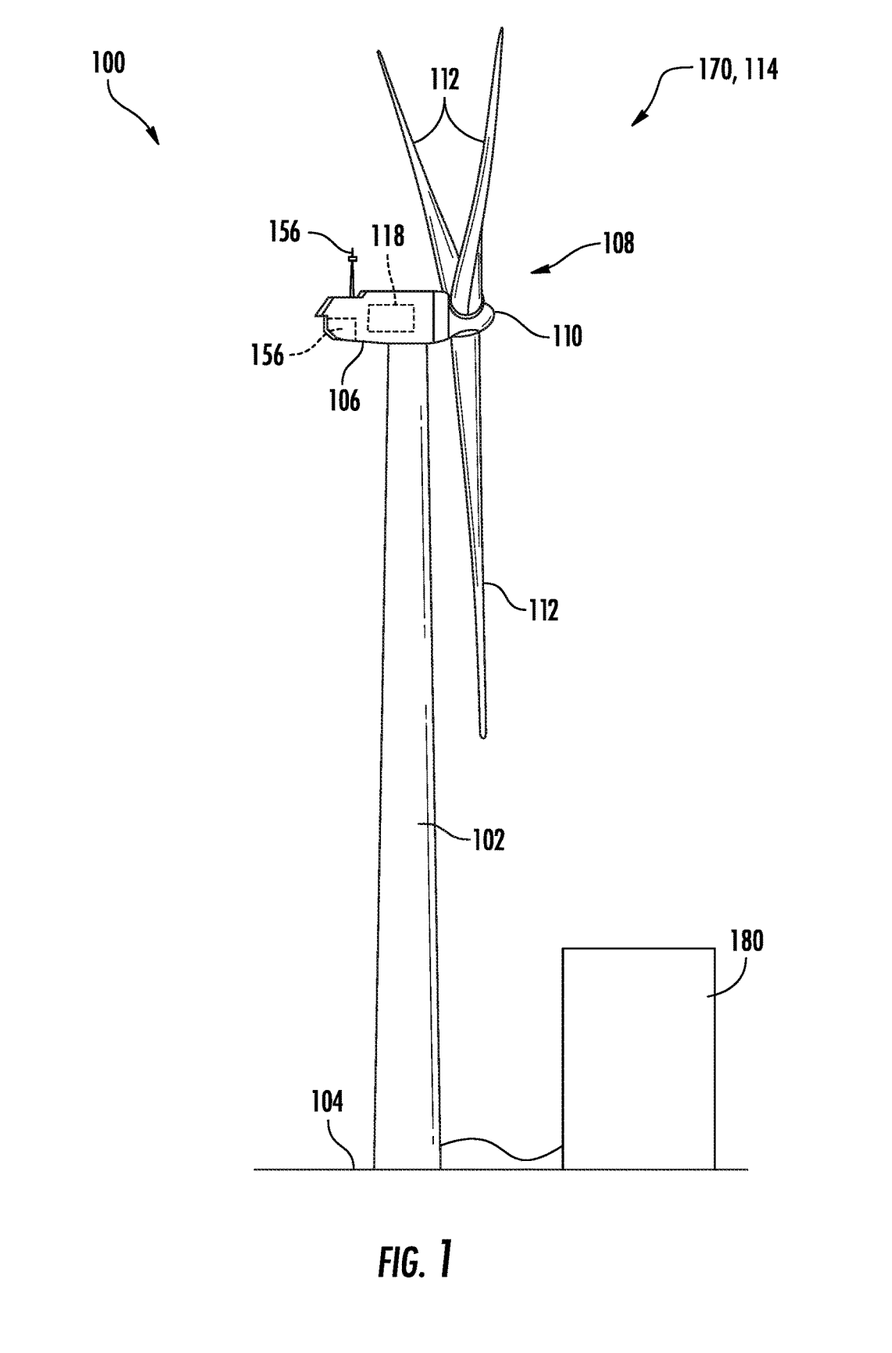
FIG. 1 illustrates a perspective view of one embodiment of a power generating asset configured as a wind turbine coupled to an energy storage device (ESD) according to the present disclosure.

Referring now to the drawings, FIG. 1 illustrates a perspective view of one embodiment of a power generating asset 100 according to the present disclosure. As shown, the power generating asset 100 may include at least one power generating subsystem 170. The power generating subsystem(s) 170 may include a generator 118. For example, the power generating subsystem(s) 170 may be configured as a wind turbine 114. In an additional embodiment, the power generating asset 100 may, for example, be configured as a solar power generating asset, a hydroelectric plant, a fossil fuel generator, and/or a hybrid power generating asset. In an embodiment, the power generating asset may include an energy storage device (ESD) 180 electrically coupled to the power generating subsystem(s) 170.

When configured as a wind turbine 114, the power generating subsystem(s) 170 may generally include a tower 102 extending from a support surface 104, a nacelle 106, mounted on the tower 102, and a rotor 108 coupled to the nacelle 106. The rotor 108 may include a rotatable hub 110 and at least one rotor blade 112 coupled to, and extending outwardly from, the hub 110. For example, in the illustrated embodiment, the rotor 108 includes three rotor blades 112. However, in an additional embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 positioned within the nacelle 106 to permit electrical energy to be produced. In an embodiment, a portion of the output of the electric generator 118 may be delivered to the ESD 180.

Figure 2:
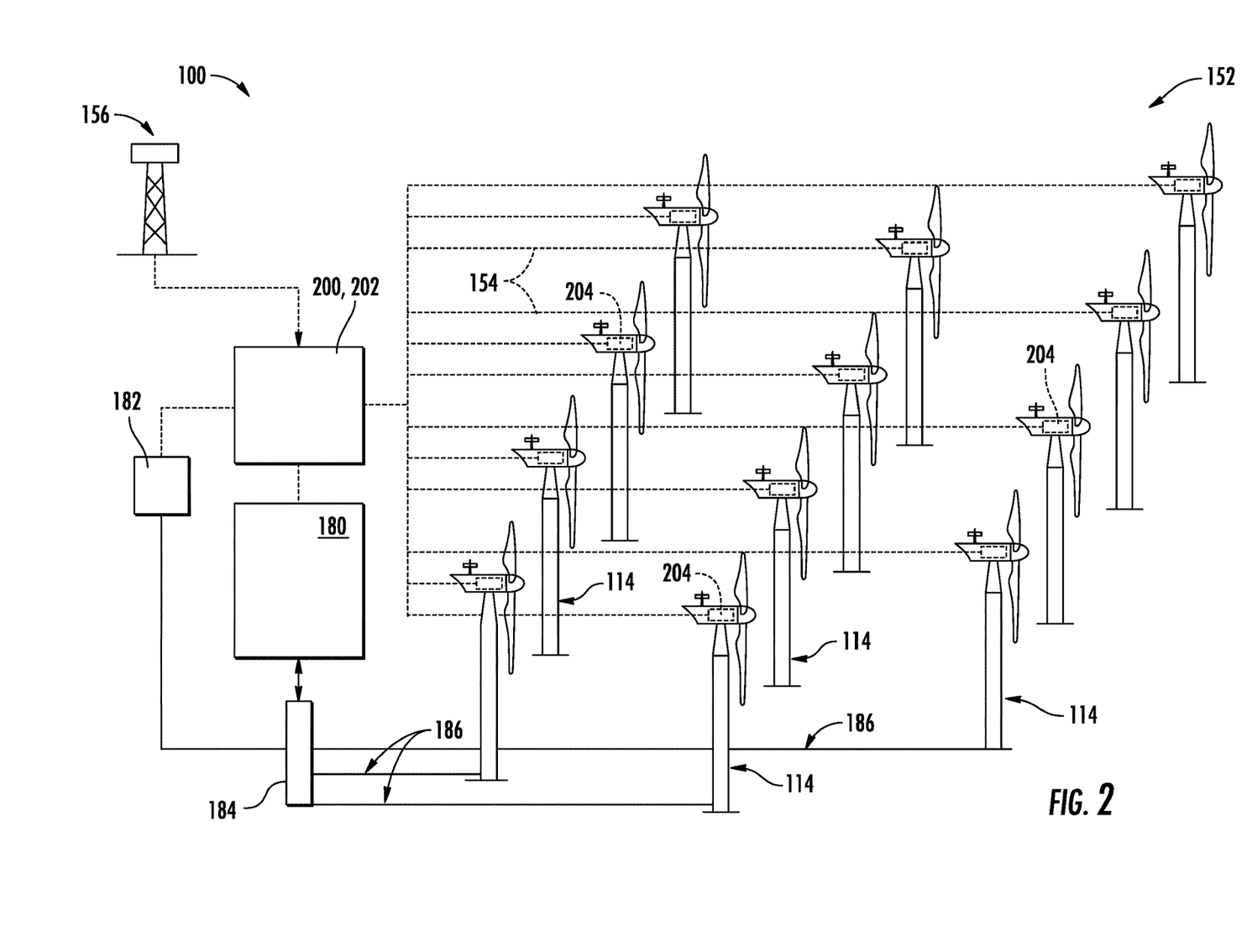
FIG. 2 illustrates a schematic diagram of one embodiment of the power generating asset configured as a wind farm having a plurality of wind turbines and an ESD according to the present disclosure.

The power generating asset for 100 may also include a controller 200 (FIG. 2). When the power generating subsystem(s) 170 is configured as a wind turbine 114, the controller 200 may be configured as a turbine controller 204 (FIG. 2) centralized within the nacelle 106. However, in other embodiments, the controller 200 may be located within any other component of the wind turbine 114 or at a location outside the wind turbine 114. Further, the controller 200 may be communicatively coupled to any number of the components of the power generating asset 100 in order to control the components. As such, the controller 200 may include a computer or other suitable processing unit. Thus, in several embodiments, the controller 200 may include suitable computer-readable instructions that, when implemented, configure the controller 200 to perform various different functions, such as receiving, transmitting and/or executing wind turbine control signals.

Still referring to FIG. 1, one or more sensors 156 may be provided on power generating subsystem(s) 170 to monitor the performance of the power generating subsystem(s) 170 and/or environmental conditions affecting the power generating subsystem(s) 170. It should also be appreciated that, as used herein, the term "monitor" and variations thereof indicates that the various sensors of the power generating subsystem(s) 170 may be configured to provide a direct measurement of the parameters being monitored or an indirect measurement of such parameters. Thus, the sensors described herein may, for example, be used to generate signals relating to the parameter being monitored, which can then be utilized by the controller 200 to determine the condition of the power generating subsystem(s) 170.

For example, as shown, the wind turbine 114 may include an environmental sensor configured for gathering data indicative of at least one environmental condition. The environmental sensor may be operably coupled to the controller 200. Thus, in an embodiment, the sensor(s) 156 may, for example, be a wind vane, an anemometer, a lidar sensor, thermometer, barometer, or other suitable sensor. The data gathered by the sensor(s) 156 may include measures of wind speed, wind direction, wind shear, wind gust, wind veer, atmospheric pressure, and/or temperature. The data gathered by the sensor(s) 156 may be utilized by the controller 200 to forecast an environmental variable projected to affect the power generating asset 100. It should be appreciated that the sensor(s) 156 may include a network of sensors and may, as depicted in FIG. 2, be positioned away from the power generating subsystem(s) 170.

Referring now to FIG. 2, schematic diagram of one embodiment of the power generating asset 100 configured as a wind farm 152. As illustrated, in an embodiment, the wind farm 152 may include a plurality power generating subsystems 170 (e.g., wind turbines 114), the ESD 180, and a controller 200. The controller 200 may be configured as a farm controller 202. For example, as shown in the illustrated embodiment, the wind farm 152 may include twelve wind turbines 114. However, in other embodiments, the wind farm 152 may include any other number of wind turbines 114, such as less than twelve wind turbines 114 or greater than twelve wind turbines 114. In one embodiment, the turbine controller(s) 204 of the wind turbine(s) 114 may be communicatively coupled to the farm controller 202 through a wired connection, such as by connecting the controller(s) 200 through suitable communicative links 154 (e.g., a suitable cable). Alternatively, the controller(s) 200 may be communicatively coupled to the farm controller 202 through a wireless connection, such as by using any suitable wireless communications protocol known in the art. In addition, the farm controller 202 may be generally configured similar to the controller 200 for each of the individual wind turbines 114 within the wind farm 152.

In an embodiment, the power generating asset 100 may be electrically coupled to an electrical grid 182. For example, in an embodiment, each of the power generating subsystems 170 may be connected to a point of interconnect (POI) 184 via a wired connection 186. Additionally, the ESD 180, may, in an embodiment, be connected to the POI 184. Being electrically coupled to the POI 184, the ESD 180 may both be configured to receive a quantity of power from the power generating subsystem(s) 170 and/or discharge a quantity of a stored charge to the electrical grid 182 based on a discharge setpoint as established by the controller 200.

Figure 3:
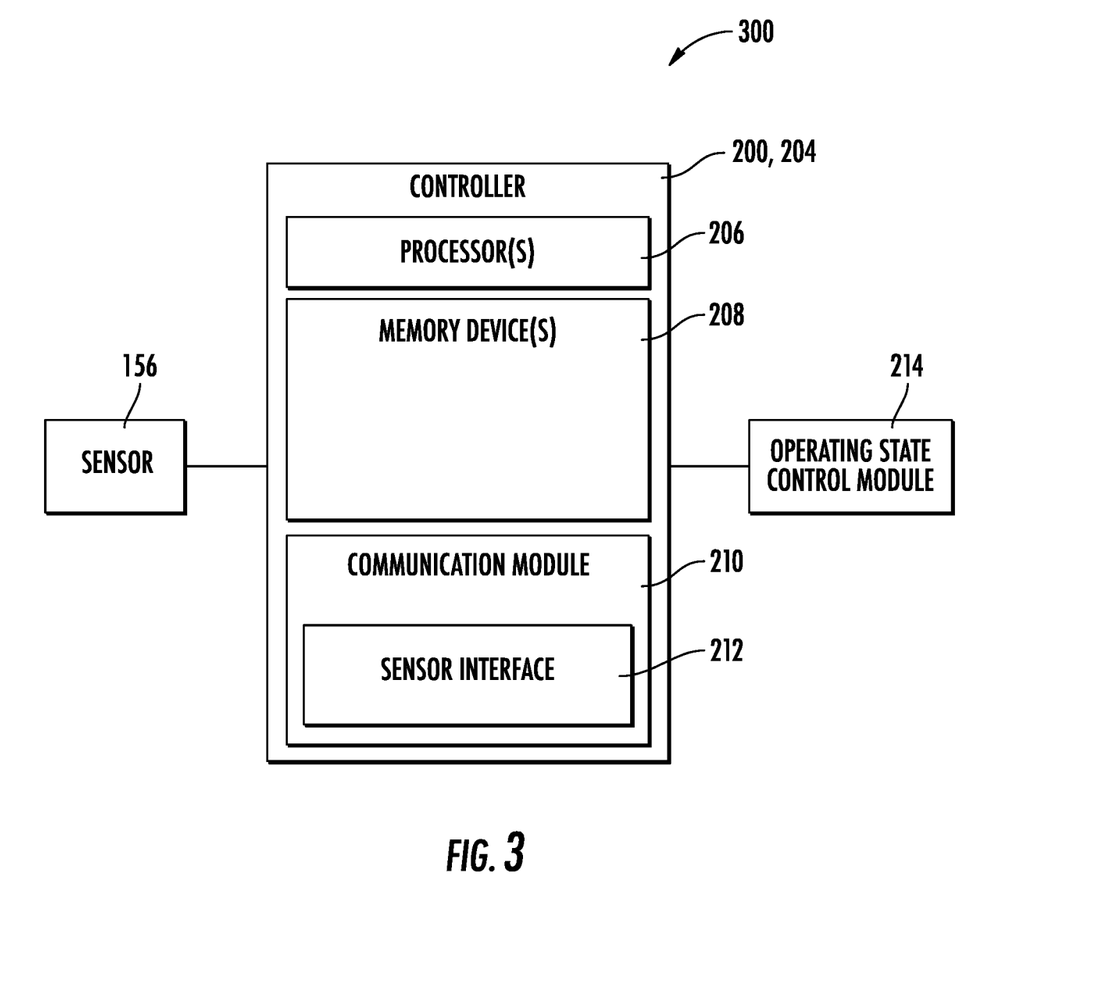
FIG. 3 illustrates a schematic diagram of one embodiment of a controller according to the present disclosure.
Figure 4:
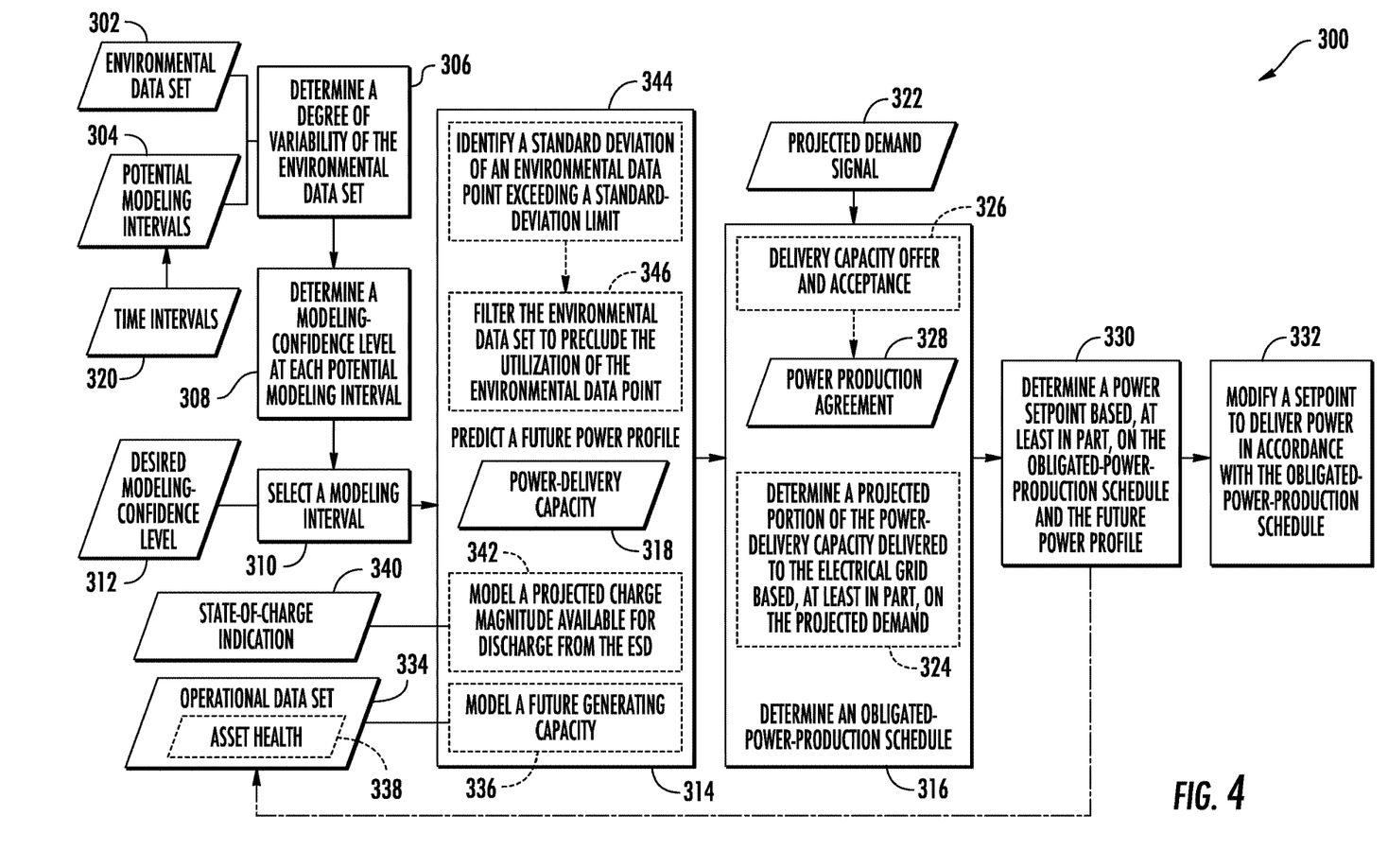
FIG. 4 illustrates a schematic diagram of one embodiment of a control logic of a system for operating a power generating asset according to the present disclosure.
Figure 5:
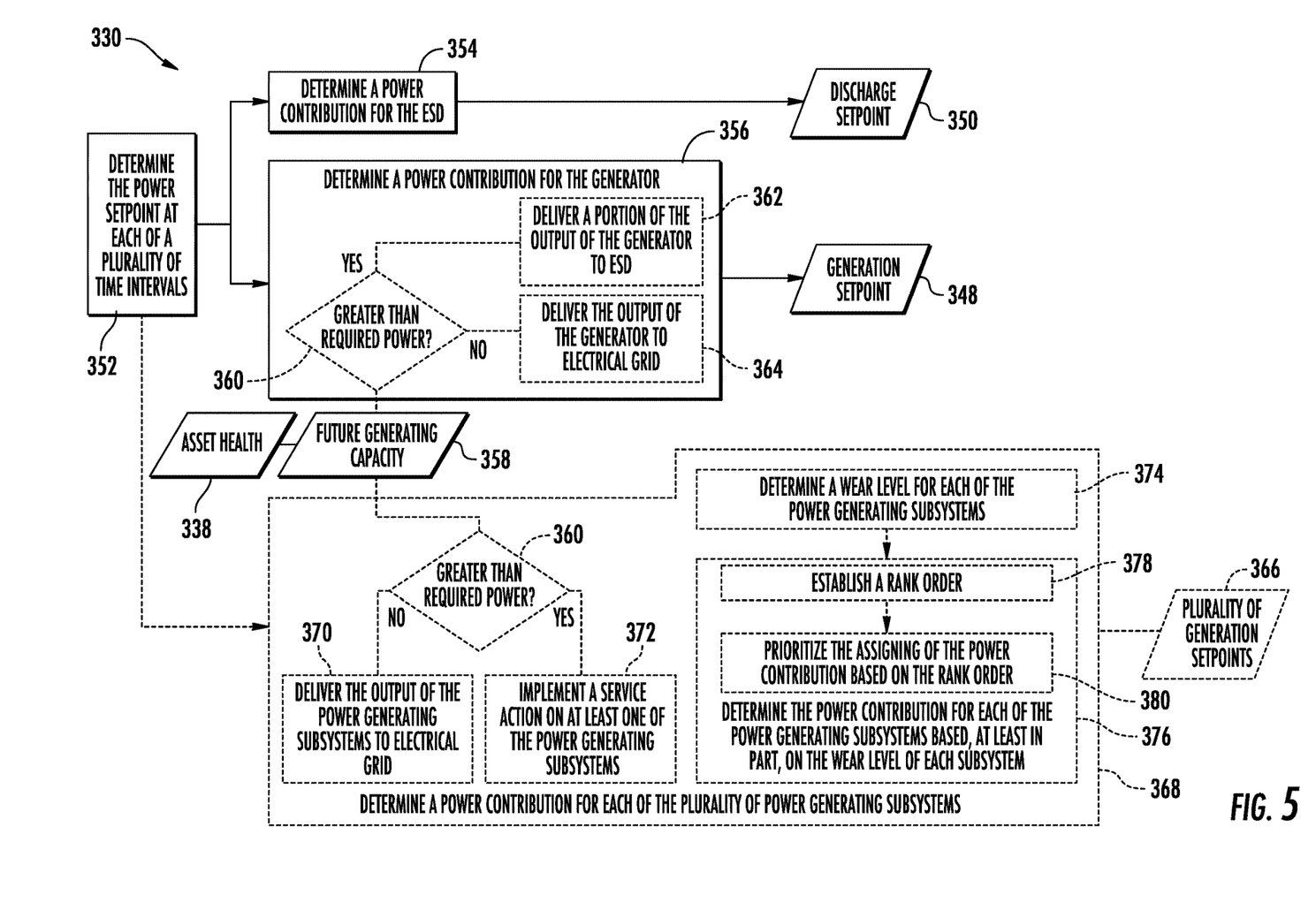
FIG. 5 illustrates a portion of the control logic of FIG. 4 according to the present disclosure.

Referring now to FIGS. 3-5, schematic diagrams of multiple embodiments of a system 300 for operating the power generating asset 100 according to the present disclosure are presented. As shown particularly in FIG. 3, a schematic diagram of one embodiment of suitable components that may be included within the controller 200 is illustrated. For example, as shown, the controller 200 may include one or more processor(s) 206 and associated memory device(s) 208 configured to perform a variety of computer-implemented functions (e.g., performing the methods, steps, calculations and the like and storing relevant data as disclosed herein). Additionally, the controller 200 may also include a communications module 210 to facilitate communications between the controller 200 and the various components of the power generating asset 100. Further, the communications module 210 may include a sensor interface 212 (e.g., one or more analog-to-digital converters) to permit signals transmitted from one or more sensors 156 to be converted into signals that can be understood and processed by the processors 206. It should be appreciated that the sensor(s) 156 may be communicatively coupled to the communications module 210 using any suitable means. For example, as shown in FIG. 3, the sensor(s) 156 are coupled to the sensor interface 212 via a wired connection. However, in other embodiments, the sensor(s) 156 may be coupled to the sensor interface 212 via a wireless connection, such as by using any suitable wireless communications protocol known in the art. Additionally, the communications module 210 may also be operably coupled to an operating state control module 214 configured to modify at least one setpoint of the power generating asset 100 to deliver power to the electrical grid 182.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform various functions as described herein, as well as various other suitable computer-implemented functions.

Referring particularly to FIG. 4, in an embodiment, the controller 200 of the system 300 may be configured control/operate the power generating asset 100 having at least one generator 118 coupled to the electrical grid 182. As described herein, the operation of the power generating asset 100 may be based, at least in part, on an obligated-power-production schedule 316. The obligated-power-production schedule 316 may, in turn, the based, at least in part, on a modeled future power profile 314 for the power generating asset 100. Accordingly, the controller 200 may be configured to receive an environmental data set 302. The environmental data set 302 may be indicative of at least one environmental variable projected to affect the power generating asset 100 over a plurality of potential modeling intervals 304. The environmental data set 302 may, in an embodiment, be a received weather forecast. For example, the environmental data set 302 may correspond to a 24-hour weather forecast.

In an embodiment, at least a portion of the environmental data set 302 may be generated and/or refined by the sensor(s) 156. For example, the 24-hour weather forecast may be received from a forecast provider. The received forecast may then be utilized by the controller 200 as described herein or may be refined by the controller 200 based on the parameters monitored by the sensor(s) 156. However, additional embodiment, the controller 200 may generate the weather forecast based on the parameters monitored by the sensor(s) 156.

In an embodiment, the potential modeling intervals 304 may correspond to a number of modeling intervals having different durations. One of the potential modeling intervals 304 may, in an embodiment, correspond to the duration of the environmental data set 302. For example, one of the potential modeling intervals may be a 24-hour modeling interval corresponding to a 24-hour weather forecast. In additional embodiments, the potential modeling intervals 304 may have durations which are less than the duration covered by the environmental data set 302. For example, the potential modeling intervals 304 may include durations of 18, 12, 10, 6, 4, 2, and/or 1 hours and combinations thereof. The potential modeling intervals 304 may extend prospectively from an instant of receipt of the environmental data set 302.

The controller 200 may, in an embodiment, determine a degree of variability 306 of the environmental data set 302 at each of the potential modeling intervals 304. The degree of variability 306 may correspond to a likelihood that the projected environmental variable will manifest over each of the potential modeling intervals 304. In other words, the environmental data set 302 (e.g., the weather forecast) may include a range of potential environmental conditions (e.g., a range of potential wind speeds). As such, the degree of variability 306 may correspond to an increase in the range of potential environmental conditions with an increase in the duration of the potential modeling intervals 304. For example, in an embodiment wherein the environmental conditions affecting the power generating asset 100 are relatively stable (e.g., predictable), the degree of variability 306 may be relatively low across a potential modeling interval 304 having a relatively long duration (e.g., 24, 18, and/or 12 hours). However, in an embodiment wherein the environmental conditions affecting the power generating asset 100 are relatively unstable (e.g., unpredictable), the degree of variability 306 may be relatively high across the potential modeling interval 304 having a relatively long duration (e.g., 24, 18, and/or 12 hours).

It should be appreciated that the degree of variability 306 for any given environmental data set 302 may increase with the duration of the potential modeling intervals 304. For example, it should be further appreciated that, a potential modeling interval 304 having duration of 60 minutes may have a lower degree of variability 306 than a potential modeling interval having a duration of 24 hours.

In order to accurately predict the future power profile 314, the controller 200 may be configured to determine a modeling-confidence level 308 at each of the plurality of potential modeling intervals 304. The modeling-confidence level 308 may be based, at least in part, on the corresponding degree of variability 306 at each of the plurality of potential modeling intervals 304. The modeling-confidence level 308 may be indicative of a likelihood that the predicted future power profile 314 may be realized by the actual performance of the power generating asset 100 when based on the environmental data set 302 lying within each of the potential modeling intervals 304. In other words, the modeling-confidence level 308 may be indicative of a degree of confidence in the output of the model implemented by the controller 200 when the degree of variability 306 of the environmental data set 302 is taken into account for each of the potential modeling intervals 304. It should be appreciated that potential modeling intervals 304 having relatively low degrees of variability 306 may result in relatively higher modeling-confidence levels 308 than may be seen for potential modeling intervals 304 having relatively high degrees of variability 306.

In an embodiment, the controller 200 may be configured to select a modeling interval 310 of the plurality of potential modeling intervals 304. In an embodiment, the selected modeling interval 310 may have a duration of at least one hour. In an additional embodiment, the selected modeling interval 310 may have a duration of less than or equal to 24 hours.

The selection of the modeling interval 310 may correspond to a desired modeling-confidence level 312. The desired modeling confidence level 312 may be established by an operator of the power generating asset 100 based on a desired likelihood that the performance of the power generating asset 100 coincides with the future power profile 314. For example, in an embodiment wherein costs may be associated with failing to achieve a performance (e.g., power delivery to the electrical grid 182) in line with the future power profile 314, the desired modeling-confidence level 312 may be relatively higher than in an embodiment wherein such costs may not attach.

Referring still to FIG. 4, in an embodiment, the controller 200 may be configured to predict, via a computer-implemented model programed therein, the future power profile 314 for the power generating asset 100 over the selected modeling interval 310. The future power profile 314 may be indicative of a power-delivery capacity 318 of the power generating asset 100 at each of a plurality of time intervals 320 of the modeling interval 310.

The power-delivery capacity 318 may represent the potential amount of power which may be available for delivery by the power generating asset 100 to the electrical grid 182 in response to the environmental variable(s) at each of the future time intervals 320. Accordingly, the power-delivery capacity 318 may correspond to the potential performance of the power generating asset 100. In an embodiment, a portion of the power-delivery capacity 318 may correspond to at least a portion of the power to be generated by the generator. In an additional embodiment, at least a portion of the power-delivery capacity 318 may correspond to a portion of the power to be discharged by the ESD 180.

The future power profile 314 of the power generating asset 100 may facilitate the satisfaction of power delivery commitments to the electrical grid 182 and/or participation in the energy markets. For example, in an embodiment, the controller 200 may receive a projected demand signal 322 from the electrical grid 182. The projected demand signal 322 may be indicative of a forecasted power availability level within the electrical grid 182. It should be appreciated that, the value of a quantity of power delivered to the electrical grid 182 at any given time may be inversely proportional to the available power within the electrical grid 182 at that time.

Based, at least in part, on the projected demand signal 322, the controller 200 may determine a projected portion 324 of the power-delivery capacity 318 of the power generating asset 100 as indicated by the future power profile 314. The projected portion 324 may correspond to a portion of the power-delivery capacity 318 to be delivered to the electrical grid 182 at each of the plurality of time intervals 320 of the modeling interval 310.

As depicted at 326, in an embodiment, at least a portion of the predicted power-delivery capacity 318 of the power generating asset 100 may be offered for delivery to the electrical grid 182 by the power generating asset 100 at the corresponding future time interval 320. Upon acceptance of this offer by the electrical grid 182, a power production agreement 328 may be formed between the power generating asset 100 and the electrical grid 182. The power production agreement 328 may, thus, correspond to a power delivery commitment of the power generating asset 100. The power production agreement 328 may include various incentives which may accrue to the benefit of the operator of the power generating asset 100 when the power delivery requirements of the power production agreement 328 are satisfied. Additionally, the power production agreement 328 may include various penalties which may accrue to the detriment of the operator of the power generating asset 100 in embodiment wherein the power delivery requirements of the power production agreement 328 are not satisfied. Accordingly, it should be appreciated that it may be desirable to satisfy the power production agreement 328. It should be further appreciated, therefore, that the degree of confidence in the predicted future power profile 314 may facilitate the formation of the power production agreement 328.

In an embodiment, the obligated-power-production schedule 316 may correspond to the power production agreement 328 with the electrical grid 182. Accordingly, the controller 200 may be configured to determine the obligated-power-production schedule 316 for the power generating asset 100 over the modeling interval 310. The obligated-power-production schedule 316 may, in an embodiment, be based, at least in part, on the future power profile 314. It should be appreciated that the obligated-power-production schedule 316 reflect a commitment to provide a specified power production from the power generating asset 100 to the electrical grid 182 at a specified time.

The controller 200 may, in an embodiment, be configured to determine at least one power setpoint 330 for the power generating asset 100 over the modeling interval 310. The power setpoint(s) 330 may be based, at least in part, on the obligated-power-production schedule 316 and/or the future power profile 314 for the power generating asset 100. Accordingly, the controller 200 may modify at least one setpoint 332 for the power generating asset 100 to deliver power to the electrical grid 182 in accordance with the obligated-power-production schedule 316. The setpoint(s) 332 may correspond to a setpoint for at least one component of the power generating asset 100 (e.g., a component of the power generating subsystem(s) 170).

Referring still to FIG. 4 in particular, in an embodiment, the prediction of the future power profile 314 for the power generating asset 100 may also be based on the operating state of the power generating asset 100. Accordingly, the controller 200 may be configured to receive an operational data set 334. The operational data set 334 may be indicative of an operating state of the power generating asset 100. The operational data set 334 may include data indicative of non-environmental variables which may impact an operation of the power generating asset 100 or a component thereof. In an embodiment, the operational data set 334 may be indicative of a preeminent control strategy which may limit a maximal power delivery of the power generating asset 100 to the electrical grid 182. For example, when the power generating subsystem(s) 170 is configured as a wind turbine 114, control strategies related to shadow flicker, grid shaping, wake management, inertial management, noise mitigation, and/or other similar control strategies and/or operating limitations may restrict or otherwise impact a quantity of electrical power which may be generated by the power generating subsystem(s) 170 in response to a given environmental condition. Accordingly, the controller 200 may model a future generating capacity 336 of the power generating asset 100 in response to the environmental variable(s) at each of the plurality of time intervals 320.

The non-environmental variables which may impact an operation of the power generating asset 100 may, in an embodiment, correspond to the health of the power generating asset 100 and/or a component thereof. Accordingly, in an embodiment, the operational data set 334 may include at least one asset health indication 338. The asset health indication(s) 338 may be indicative of a wear level of at least one component of the power generating asset 100. In an embodiment, the wear level may limit the future generating capacity 336 of the power generating asset 100. For example, it may be desirable to limit a number of actuations and/or magnitude thereof of a control system affecting a component of the power generating asset 100 in order to preserve a remaining lifespan of the component. In an additional embodiment, the asset health indication(s) 338 in combination with the environmental variable(s) may indicate an increased future generating capacity. For example, the ambient temperature may correspond to an optimal discharge temperature range for the ESD 180. Under such conditions, the ESD 180 may an ability to support a discharge rate in excess of a standard discharge rate.

The predicting of the future power profile 314, via the computer-implemented model programmed in the controller 200, may, in an embodiment, include consideration of the state-of-charge of the ESD 180. Accordingly, in an embodiment, the controller 200 may be configured to receive a state-of-charge indication 340 from the ESD 180. Based on the state-of-charge indication 340, the controller 200 may employ the computer-implemented model programmed therein to model a projected charge magnitude 342. The projected charge magnitude 342 may correspond to a portion of the charge of the ESD 180 which may be available for discharge to the electrical grid 182 at each of the plurality of time intervals 320. As such, in an embodiment, the power-delivery capacity 318 may include a portion of the potential amount of power available for delivery that may be obtained from the ESD 180 and/or a portion which may be generated (e.g. by the generator(s) 118) in response to the environmental variable(s).

In an embodiment, it may be desirable to increase the confidence in the output of the computer-implemented model by filtering at least one of the inputs thereto. Accordingly, as depicted at 344, the controller 200 may identify at least one data point of the environmental data set 302 having a standard deviation which exceeds a standard deviation limit. The controller 200 may then, as depicted at 346, filter the environmental data set 302 so as to preclude consideration of the at least one data point in the modeling of the future power profile 314.

Referring now to FIG. 5, wherein a portion of the control logic of the system 300 for operating the power generating asset 100 is depicted. In particular, FIG. 5 depicts portions of the control logic described in FIG. 4 related to the determination of the power setpoint(s) 330. In an embodiment, the power setpoint(s) 330 may include a generation setpoint 348 for the generator(s) 118 of the power generating asset 100. In an additional embodiment, the power setpoint(s) 330 may include a discharge setpoint 354 the ESD 180 of the power generating asset 100.

As depicted at 352, the controller 200 may determine a power setpoint 330 at each of the plurality of time intervals 320 across the modeling interval 310. In an embodiment, each time interval 320 may have a duration of at least one minute. In an additional embodiment, each time interval 320 may have a duration of less than or equal to 15 minutes. It should be appreciated that the power setpoint(s) 330 may be configured to conform to the obligated-power-production schedule 316 at each of the time intervals 320.

As depicted at 354, the controller 200 may determine a power contribution at each time interval 320 for the ESD 180. The power contribution may correspond to a portion of the quantity of power to be delivered to the electrical grid 182 in accordance with the obligated-power-production schedule 316. Accordingly, the controller 200 may determine the discharge setpoint 350 based on the power contribution for the ESD 180.

As depicted at 356, the controller 200 may determine a power contribution at each time interval 320 for the generator(s) 118. The power contribution may correspond to a portion of the quantity of power to be delivered to the electrical grid 182 in accordance with the obligated-power-production schedule 316. Accordingly, the controller 200 may determine the generation setpoint 348 based on the power contribution for the generator(s) 118.

In an embodiment, the power contribution for the generator(s) 118 may be based, at least in part, on the predicted amount of power which may be generated by the generator(s) 118 in response to the environmental conditions. The predicted amount of power be limited by the wear level of at least one component of the power generating asset 100. As such, the determination of the predicted amount of power may incorporate the asset health indication(s) 338.

In an embodiment, the controller 200 may receive, or determine, a future generating capacity 358 for the generator(s) 118, which may incorporate asset health as reflected by the asset health indication(s) 338. As depicted at 360, the controller 200 may determine whether the future generating capacity 358 (e.g., the future power generation capability) of the power generating asset 100 is greater than the quantity of power required from the power generating asset 100 in accordance with the obligated-power-production schedule 316. In an embodiment wherein the future generating capacity 358 exceeds the quantity of power required from the power generating asset 100 at any given time interval 320, a portion 362 of the output of the generator(s) 118 may be delivered to the ESD 180.

It should be appreciated that delivering the portion 362 of the power output of the generator(s) 118 to the ESD 180 may reduce the quantity of the power delivered to the electrical grid 182 by the power generating asset 100 at each time interval 320. Such a reduction may, in an embodiment, align the power delivered to the electrical grid at each of the plurality of time intervals 320 with the power production agreement 328.

It should further be appreciated that, as depicted at 364, in an embodiment wherein the future generating capacity 358 does not exceed the quantity of power required from the power generating asset 100 in accordance with the obligated-power-production schedule 316, substantially the entirety of the output of the generator(s) 118 may be delivered to the electrical grid 182.

In an embodiment, such as depicted in FIG. 2, the power generating asset 100 may include a plurality of generators 118 corresponding to each of the plurality of power generating subsystems 170. In such an embodiment, the generation setpoint 348 may include a plurality of generation setpoints 366 corresponding to each of the generators 118 of the plurality of power generating subsystems 170. As depicted at 368, in such an embodiment, the controller 200 may determine a power contribution at each time interval 320 for each of the plurality of power generating subsystems 170. The power contribution may correspond to a portion of the quantity of power to be delivered to the electrical grid 182 in accordance with the obligated-power-production schedule 316. Accordingly, the controller 200 may determine the plurality of generation setpoints 366 based on the power contributions of the generators 118 of the plurality of power generating subsystems 170. For example, in an embodiment, the controller 200 may determine a power generation setpoint 348 for each wind turbine 114 of the wind farm 152 corresponding to a required power contribution from each wind turbine 114.

As previously discussed, the controller may receive, or determine, a future generating capacity 358 for the generators 118 of the power generating subsystems 170. As depicted at 360, the controller 200 may determine whether the future generating capacity 358 (e.g., the future power generation capability) of the power generating asset 100 is greater than the quantity of power required from the power generating asset 100 in accordance with the obligated-power-production schedule 316. As depicted at 370, in an embodiment wherein the future generating capacity 358 does not exceed the quantity of power required from the power generating asset 100 by the obligated-power-production schedule 316, substantially the entirety of the output of the generators 118 may be delivered to the electrical grid 182.

As depicted at 372, in an embodiment wherein the future generating capacity 358 exceeds the quantity of power required from the power generating asset 100 at any given time interval 320, a service action may be implemented on at least one of the plurality of power generating subsystems 170. It should be appreciated that implementing the service action may reduce the quantity of power delivered to the electrical grid 182 by the power generating asset 100 so as to align with the power production agreement 328.

Referring still to FIG. 5, in an embodiment determining the power generation contribution at each time interval 320 for each of the plurality of power generating subsystems 170 may also account for differing wear levels across the power generating asset 100. Accordingly, the controller 200 may determine a wear level 374 for each of the power generating subsystems 170. As depicted at 376, the controller 200 may therefore determine a power generation contribution for each of the plurality of power generating subsystems 170 based, at least in part, on the wear level 374 of each of the plurality of power generating subsystems 170.

For example, in an embodiment, the controller 200 may establish a rank ordering 378 of each of the plurality of power generating subsystems 170. The rank ordering 378 may be based on the wear level 374 of each of the plurality of power generating subsystems 170. The rank ordering 378 may, for example, be arranged from a minimal wear level to a maximum wear level.

In an embodiment wherein the plurality of power generating subsystems 170 are rank ordered, the controller may, as depicted at 380 prioritize the assigning of the power contribution of each based on the rank ordering 378. For example, the power contribution of each of the plurality of power generating subsystems 170 may be assigned first to the power generating subsystems 170 having the lowest wear level (e.g. the minimal wear level) and progress to the power generating subsystems 170 having the greatest wear level (e.g., the maximal wear level). It should be appreciated that, the obligated-power-production schedule 316 may be satisfied by less than the totality of the plurality of the power generating subsystems 170. Accordingly, additional wear accumulation by the power generating subsystems 170 having the greatest wear levels may be precluded by limiting the power contribution of such power generating subsystems 170.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for operating a power generating asset coupled to an electrical grid, the power generating asset having at least one generator, the method comprising: receiving, via a controller, an environmental data set indicative of at least one environmental variable projected to affect the power generating asset over a plurality of potential modeling intervals; determining, via the controller, a degree of variability of the environmental data set at each of the plurality of potential modeling intervals; determining, via the controller, a modeling-confidence level at each of the plurality of potential modeling intervals based, at least in part, on the corresponding degree of variability; selecting, via the controller, a modeling interval of the plurality of potential modeling intervals corresponding to a desired modeling-confidence level; predicting, via a computer-implemented model programmed in the controller, a future power profile for the power generating asset over the selected modeling interval, the future power profile being indicative of a power-delivery capacity of the power generating asset at each of a plurality of time intervals of the modeling interval; determining, via the controller, an obligated-power-production schedule for the power generating asset over the modeling interval based, at least in part, on the future power profile, wherein the obligated-power-production schedule corresponds to a power production agreement with the electrical grid; and modifying, via the controller, at least one setpoint of the power generating asset to deliver power to the electrical grid in accordance with the obligated-power-production schedule.

Clause 2. The method of clause 1, wherein the modeling interval has a duration of at least one hour and less than or equal to 24 hours.

Clause 3. The method of any preceding clause, wherein predicting the future power profile for the power generating asset further comprises: receiving, via the controller, an operational data set indicative of an operating state of the power generating asset; and modeling, via the controller, a future generating capacity of the power generating asset in response to the at least one environmental variable at each of the plurality of time intervals based, at least in part, on the operating state of the power generating asset.

Clause 4. The method of any preceding clause, wherein the operational data set further comprises an asset health indication, the asset health indication being indicative of a wear level of at least one component of the power generating asset which impacts the future generating capacity of the power generating asset.

Clause 5. The method of any preceding clause, wherein the power generating asset further comprises an energy storage device electrically coupled to the at least one generator, and wherein predicting the future power profile for the power generating asset further comprises: receiving, via the controller, a state-of-charge indication from the energy storage device; and modeling, via the computer-implemented model programmed in the controller, a projected charge magnitude of the energy storage device available for discharge to the electrical grid at each of the plurality of time intervals based, at least in part, on the state-of-charge indication.

Clause 6. The method of any preceding clause, wherein predicting the future power profile for the power generating asset further comprises: identifying, via the controller, at least one data point of the environmental data set having a standard deviation which exceeds a standard deviation limit; and filtering, via the controller, the environmental data set so as to preclude a consideration of the at least one data point in the modeling of the future power profile.

Clause 7. The method of any preceding clause, wherein determining the obligated-power-production schedule for the power generating asset further comprises: receiving, via the controller, a projected demand signal from the electrical grid, the projected demand signal being indicative of a forecasted power availability level within the electrical grid; and determining, via the controller, a projected portion of the power-delivery capacity of the power generating asset delivered to the electrical grid at each of the plurality of time intervals of the modeling interval based, at least in part, on the projected demand signal.

Clause 8. The method of any preceding clause, wherein the power generating asset further comprises an energy storage device electrically coupled to the at least one generator, and wherein the method further comprises: determining, via the controller, a power setpoint for the power generating asset over the modeling interval, wherein the power setpoint is based, at least in part, on the obligated-power-production schedule and the future power profile for the power generating asset, the power setpoint comprising: a generation setpoint for the generator of the power generating asset, and a discharge setpoint for the energy storage device of the power generating asset.

Clause 9. The method of any preceding clause, wherein determining the power setpoint further comprises: determining, via the controller, the power setpoint at each of a plurality of time intervals across the modeling interval, wherein each time interval has a duration of at least one minute and less than or equal to 15 minutes.

Clause 10. The method of any preceding clause, wherein determining the power setpoint further comprises: determining, via the controller, a power contribution at each time interval for the energy storage device, wherein the power contribution corresponds to a portion of a quantity of power delivered to the electrical grid in accordance with the obligated-power-production schedule; and determining, via the controller, the discharge setpoint based on the power contribution.

Clause 11. The method of any preceding clause, wherein determining the power setpoint further comprises: determining, via the controller, a power contribution at each time interval for the generator of the power generating asset, wherein the power contribution corresponds to a portion of a quantity of power delivered to the electrical grid in accordance with the obligated-power-production schedule; and determining, via the controller, the generation setpoint based on the power contribution.

Clause 12. The method of any preceding clause, wherein determining the power contribution at each time interval for the generator further comprises: delivering a portion of a power output of the generator to the energy storage device when a future generating capacity of the power generating asset is greater than the quantity of power required from the power generating asset in accordance with the obligated-power-production schedule, wherein delivering the portion of the power output of the generator to the energy storage device reduces the quantity of the power delivered to the electrical grid by the power generating asset so as to align with the power production agreement.

Clause 13. The method of any preceding clause, wherein the at least one generator comprises a plurality of generators corresponding to each of a plurality of power generating subsystems, wherein the generation setpoint comprises a plurality of generation setpoints corresponding to each of the generators of the plurality of power generating subsystems, and wherein determining the power setpoint further comprises: determining, via the controller, a power contribution at each time interval for each of the plurality of power generating subsystems, wherein the power contribution corresponds to a portion of a quantity of power delivered to the electrical grid in accordance with the obligated-power-production schedule; and determining, via the controller, the plurality of generation setpoints based on the power contribution.

Clause 14. The method of any preceding clause, wherein determining the power contribution at each time interval for each of the plurality of power generating subsystems further comprises: implementing a service action on at least one of the plurality of power generating subsystems when a future generating capacity of the power generating asset is greater than the quantity of power required from the power generating asset in accordance with the obligated-power-production schedule, wherein implementing the service action reduces the quantity of power delivered to the electrical grid by the power generating asset so as to align with the power production agreement.

Clause 15. The method of any preceding clause, wherein determining the power contribution at each time interval for each of the plurality of power generating subsystems further comprises: determining, via the controller, a wear level for each of the plurality of power generating subsystems; and determining the power contribution for each of the plurality of power generating subsystems is based, at least in part, on the wear level of each of the plurality of power generating subsystems.

Clause 16. The method of any preceding clause, wherein determining the power contribution for each of the plurality of power generating subsystems based, at least in part, on the wear level further comprises: rank ordering, via the controller, each of the plurality of power generating subsystems based on the wear level of each of the plurality of power generating subsystems from a minimal wear level to a maximal wear level; and prioritizing the assigning, via the controller, of the power contribution of each of the plurality of power generating subsystems from the minimal wear level to the maximal wear level.

Clause 17. A system for operating a power generating asset having at least one generator, the system comprising: a controller communicatively coupled to the generator, the controller comprising at least one processor configured to perform a plurality of operations, the plurality of operations comprising: receiving an environmental data set indicative of at least one environmental variable projected to affect the power generating asset over a plurality of potential modeling intervals, determining a degree of variability of the environmental data set at each of the plurality of potential modeling intervals, determining a modeling-confidence level at each of the plurality of potential modeling intervals based, at least in part, on the corresponding degree of variability, selecting a modeling interval of the plurality of potential modeling intervals corresponding to a desired modeling-confidence level, predicting, via a computer-implemented model programmed in the controller, a future power profile for the power generating asset over the selected modeling interval, the future power profile being indicative of a power-delivery capacity of the power generating asset at each of a plurality of time intervals of the modeling interval, determining an obligated-power-production schedule for the power generating asset over the modeling interval based, at least in part, on the future power profile, wherein the obligated-power-production schedule corresponds to a power production agreement with the electrical grid, and modifying at least one setpoint of the power generating asset to deliver power to the electrical grid in accordance with the obligated-power-production schedule.

Clause 18. The system of any preceding clause, wherein the power generating asset further comprises an energy storage device electrically coupled to the at least one generator and communicatively coupled to the controller, and wherein predicting the future power profile for the power generating asset further comprises: receiving a state-of-charge indication from the energy storage device; and modeling, via the computer-implemented model, a projected charge magnitude of the energy storage device available for discharge to the electrical grid at each of the plurality of time intervals.

Clause 19. The system of any preceding clause, wherein determining the obligated-power-production schedule for the power generating asset further comprises: receiving a projected demand signal from the electrical grid, the projected demand signal being indicative of a forecasted power availability level within the electrical grid; and determining a projected portion of the power-delivery capacity of the power generating asset delivered to the electrical grid at each of the plurality of time intervals of the modeling interval based, at least in part, on the projected demand signal.

Clause 20. The system of any preceding clause, wherein the power generating asset further comprises a plurality of power generating subsystems, wherein the at least one generator comprises a plurality of generators corresponding to each of the plurality of power generating subsystems, and wherein the method further comprises: determining a power setpoint for each of the power generating subsystems and the energy storage device over the modeling interval, the power setpoint being based, at least in part, on the obligated-power-production schedule and the future power profile for the power generating asset wherein the power contribution corresponds to a portion of a quantity of power delivered to the electrical grid in accordance with the obligated-power-production schedule.

What is claimed is:

1. A method for operating a hybrid power generating asset coupled to an electrical grid, the hybrid power generating asset having a plurality of types of power generating subsystems, the plurality of types of power generating subsystems comprising an energy storage device and at least one wind turbine having a generator, the method comprising:
receiving, via a controller, an environmental data set indicative of at least one environmental variable projected to affect the hybrid power generating asset over a plurality of potential modeling intervals;
determining, via the controller, a degree of variability of the environmental data set at each of the plurality of potential modeling intervals;
determining, via the controller, a modeling-confidence level at each of the plurality of potential modeling intervals based, at least in part, on the corresponding degree of variability;
selecting, via the controller, a modeling interval of the plurality of potential modeling intervals in which the degree of variability of the environment data set is below a variability threshold and the modeling-confidence level is above a confidence threshold;
predicting, via a computer-implemented model programmed in the controller, a future power profile for the hybrid power generating asset over the selected modeling interval, the future power profile being indicative of a power-delivery capacity of the hybrid power generating asset at each of a plurality of time intervals of the selected modeling interval, wherein the modeling-confidence level is established based on a desired likelihood that performance of the hybrid power generating asset coincides with the future power profile;
determining, via the controller, an obligated-power-production schedule for the hybrid power generating asset over the selected modeling interval based, at least in part, on the future power profile, wherein the obligated-power-production schedule corresponds to a power production agreement with the electrical grid;
modifying, via an operating state control module of the controller, at least one setpoint of each of the plurality of types of power generating subsystems for the hybrid power generating asset; and
operating, via the controller, the hybrid power generating asset at the at least one setpoint of each of the plurality of types of power generating subsystems to deliver power to the electrical grid in accordance with the obligated-power-production schedule.

2. The method of claim 1, wherein the modeling interval has a duration of at least one hour and less than or equal to 24 hours.

3. The method of claim 1, wherein predicting the future power profile for the hybrid power generating asset further comprises:
receiving, via the controller, an operational data set indicative of an operating state of the hybrid power generating asset; and
modeling, via the controller, a future generating capacity of the hybrid power generating asset in response to the at least one environmental variable at each of the plurality of time intervals based, at least in part, on the operating state of the hybrid power generating asset.

4. The method of claim 3, wherein the operational data set further comprises an asset health indication, the asset health indication being indicative of a wear level of the at least one component of the hybrid power generating asset which impacts the future generating capacity of the hybrid power generating asset.

5. The method of claim 1, wherein the hybrid power generating asset further comprises an energy storage device electrically coupled to the generator, and wherein predicting the future power profile for the hybrid power generating asset further comprises:
receiving, via the controller, a state-of-charge indication from the energy storage device; and
modeling, via the computer-implemented model programmed in the controller, a projected charge magnitude of the energy storage device available for discharge to the electrical grid at each of the plurality of time intervals based, at least in part, on the state-of-charge indication.

6. The method of claim 1, wherein predicting the future power profile for the hybrid power generating asset further comprises:
identifying, via the controller, at least one data point of the environmental data set having a standard deviation which exceeds a standard deviation limit; and
filtering, via the controller, the environmental data set so as to preclude a consideration of the at least one data point in the modeling of the future power profile.

7. The method of claim 1, wherein determining the obligated-power-production schedule for the hybrid power generating asset further comprises:
receiving, via the controller, a projected demand signal from the electrical grid, the projected demand signal being indicative of a forecasted power availability level within the electrical grid; and
determining, via the controller, a projected portion of the power-delivery capacity of the hybrid power generating asset delivered to the electrical grid at each of the plurality of time intervals of the modeling interval based, at least in part, on the projected demand signal.

8. The method of claim 1, further comprising:
determining, via the controller, a power setpoint for the hybrid power generating asset over the modeling interval, wherein the power setpoint is based, at least in part, on the obligated-power-production schedule and the future power profile for the hybrid power generating asset, the power setpoint comprising:
a generation setpoint for the generator of the hybrid power generating asset, and
a discharge setpoint for the energy storage device of the hybrid power generating asset.

9. The method of claim 8, wherein determining the power setpoint further comprises:
determining, via the controller, the power setpoint at each of a plurality of time intervals across the modeling interval, wherein each time interval has a duration of at least one minute and less than or equal to 15 minutes.

10. The method of claim 9, wherein determining the power setpoint further comprises:
determining, via the controller, a power contribution at each time interval for the energy storage device, wherein the power contribution corresponds to a portion of a quantity of power delivered to the electrical grid in accordance with the obligated-power-production schedule; and
determining, via the controller, the discharge setpoint based on the power contribution.

11. The method of claim 9, wherein determining the power setpoint further comprises:
   determining, via the controller, a power contribution at each time interval for the generator of the hybrid power generating asset, wherein the power contribution corresponds to a portion of a quantity of power delivered to the electrical grid in accordance with the obligated-power-production schedule; and
   determining, via the controller, the generation setpoint based on the power contribution.

12. The method of claim 11, wherein determining the power contribution at each time interval for the generator further comprises:
   delivering a portion of a power output of the generator to the energy storage device when a future generating capacity of the hybrid power generating asset is greater than the quantity of power required from the hybrid power generating asset in accordance with the obligated-power-production schedule, wherein delivering the portion of the power output of the generator to the energy storage device reduces the quantity of the power delivered to the electrical grid by the hybrid power generating asset so as to align with the power production agreement.

13. The method of claim 8, wherein the generation setpoint comprises a plurality of generation setpoints corresponding to a plurality of generators of a plurality of wind turbines, and wherein determining the power setpoint further comprises:
   determining, via the controller, a power contribution at each time interval for each of the plurality of wind turbines, wherein the power contribution corresponds to a portion of a quantity of power delivered to the electrical grid in accordance with the obligated-power-production schedule; and
   determining, via the controller, the plurality of generation setpoints based on the power contribution.

14. The method of claim 13, wherein determining the power contribution at each time interval for each of the plurality of wind turbines further comprises:
   implementing a service action on at least one of the plurality of wind turbines when a future generating capacity of the hybrid power generating asset is greater than the quantity of power required from the hybrid power generating asset in accordance with the obligated-power-production schedule, wherein implementing the service action reduces the quantity of the power delivered to the electrical grid by the hybrid power generating asset so as to align with the power production agreement.

15. The method of claim 13, wherein determining the power contribution at each time interval for each of the plurality of wind turbines further comprises:
   determining, via the controller, a wear level for each of the plurality of wind turbines; and
   determining the power contribution for each of the plurality of wind turbines is based, at least in part, on the wear level of each of the plurality of wind turbines.

16. The method of claim 15, wherein determining the power contribution for each of the plurality of wind turbines based, at least in part, on the wear level further comprises:
   rank ordering, via the controller, each of the plurality of wind turbines based on the wear level of each of the plurality of wind turbines from a minimal wear level to a maximal wear level; and
   prioritizing the assigning, via the controller, of the power contribution of each of the plurality of wind turbines from the minimal wear level to the maximal wear level.

17. A system for operating a hybrid power generating asset having a plurality of types of power generating subsystems, the plurality of types of power generating subsystems comprising an energy storage device and at least one generator, the system comprising:
   a controller communicatively coupled to the generator, the controller comprising a non-transitory computer readable medium storing a program configured to cause a computer to execute a plurality of operations, the plurality of operations comprising:
      receiving an environmental data set indicative of at least one environmental variable projected to affect the hybrid power generating asset over a plurality of potential modeling intervals,
      determining a degree of variability of the environmental data set at each of the plurality of potential modeling intervals,
      determining a modeling-confidence level at each of the plurality of potential modeling intervals based, at least in part, on the corresponding degree of variability,
      selecting a modeling interval of the plurality of potential modeling intervals in which the degree of variability of the environment data set is below a variability threshold and the modeling-confidence level is above a confidence threshold,
      predicting, via a computer-implemented model programmed in the controller, a future power profile for the hybrid power generating asset over the selected modeling interval, the future power profile being indicative of a power-delivery capacity of the hybrid power generating asset at each of a plurality of time intervals of the modeling interval, wherein the modeling-confidence level is established based on a desired likelihood that performance of the hybrid power generating asset coincides with the future power profile,
      determining an obligated-power-production schedule for the hybrid power generating asset over the modeling interval based, at least in part, on the future power profile, wherein the obligated-power-production schedule corresponds to a power production agreement with the electrical grid,
      modifying at least one setpoint of each of the plurality of types of power generating subsystems for the hybrid power generating asset, and
      operating the hybrid power generating asset at the at least one setpoint of each of the plurality of types of power generating subsystems to deliver power to the electrical grid in accordance with the obligated-power-production schedule.

18. The system of claim 17, wherein predicting the future power profile for the hybrid power generating asset further comprises:
   receiving a state-of-charge indication from the energy storage device; and
   modeling, via the computer-implemented model, a projected charge magnitude of the energy storage device available for discharge to the electrical grid at each of the plurality of time intervals.

19. The system of claim 18, wherein determining the obligated-power-production schedule for the hybrid power generating asset further comprises:

receiving a projected demand signal from the electrical grid, the projected demand signal being indicative of a forecasted power availability level within the electrical grid; and determining a projected portion of the power-delivery capacity of the hybrid power generating asset delivered to the electrical grid at each of the plurality of time intervals of the modeling interval based, at least in part, on the projected demand signal.

20. The system of claim 18, wherein the hybrid power generating asset further comprises a plurality of power generating subsystems, wherein the at least one generator comprises a plurality of generators corresponding to each of the plurality of power generating subsystems, and wherein the method further comprises:

determining a power setpoint for each of the power generating subsystems and the energy storage device over the modeling interval, the power setpoint being based, at least in part, on the obligated-power-production schedule and the future power profile for the hybrid power generating asset wherein the power contribution corresponds to a portion of a quantity of power delivered to the electrical grid in accordance with the obligated-power-production schedule.

* * * * *